April 4, 1967

L. BLUM ETAL 3,312,029

BARRIER STRUCTURE

Filed Dec. 13, 1963

INVENTORS.
*Louis Blum &*
*William J. Horgan,*
BY
*Paul & Paul*
ATTORNEYS

April 4, 1967
L. BLUM ETAL
3,312,029
BARRIER STRUCTURE
Filed Dec. 13, 1963
3 Sheets-Sheet 2
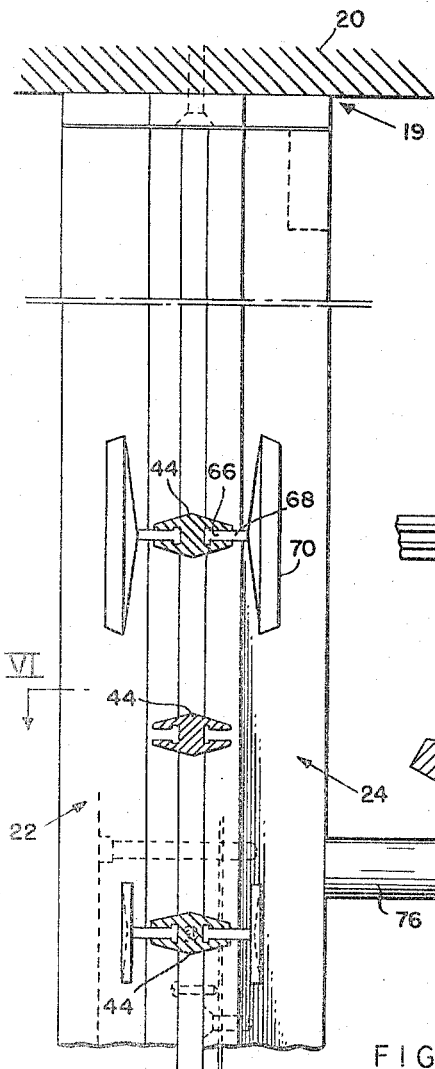
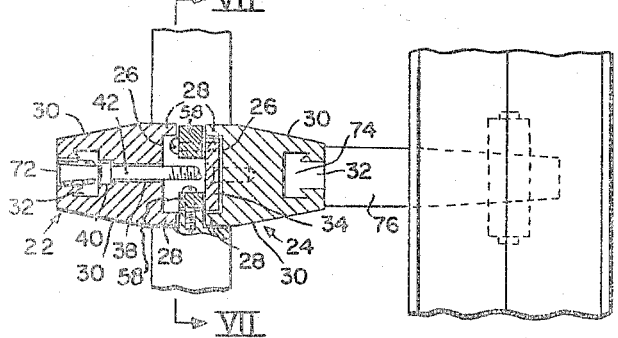
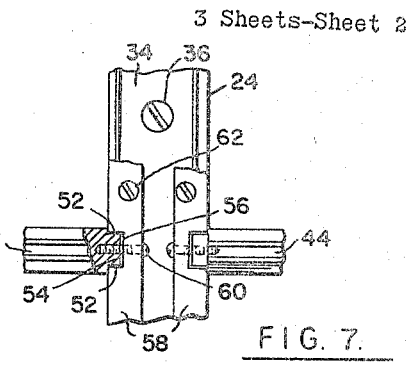
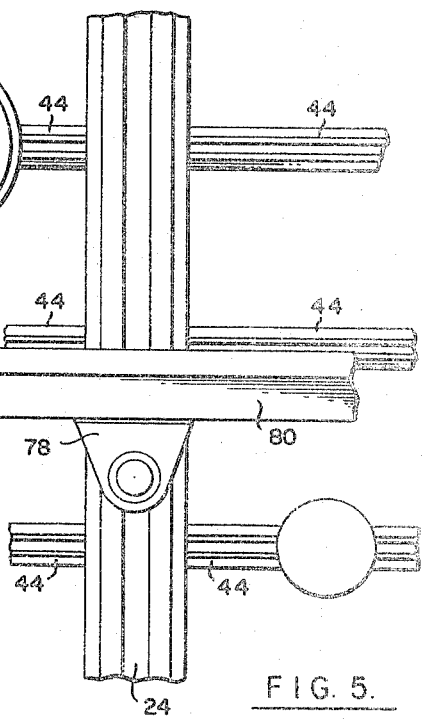
FIG. 4.
FIG. 5.
FIG. 6.
FIG. 7.
INVENTORS.
Louis Blum &
William J. Horgan,
BY
Paul & Paul
ATTORNEYS April 4, 1967

L. BLUM ETAL 3,312,029

BARRIER STRUCTURE

Filed Dec. 13, 1963

INVENTORS.
Louis Blum &
William J. Horgan,
BY
Paul & Paul
ATTORNEYS

United States Patent Office 3,312,029
Patented Apr. 4, 1967

3,312,029
BARRIER STRUCTURE
Louis Blum and William J. Horgan, Jr., Pittsburgh, Pa., assignors to Blumcraft of Pittsburgh, Pittsburgh, Pa., a firm
Filed Dec. 13, 1963, Ser. No. 330,389
2 Claims. (Cl. 52—495)

This invention relates to barriers constructed of a system of panels and for use in connection with interior stairways and as room dividers.

An important object of the invention is to provide such a barrier with improved means for mounting the panels.

Another object is to provide such a barrier comparatively simple in form, economical to manufacture and erect and flexible in use.

Other objects of the invention will become apparent when the following description is read with reference to the accompanying drawings, wherein:

FIG. 4 is an enlarged section on line IV—IV in FIG. 1;

FIG. 5 is a fragmentary rear elevation of the barrier, as indicated by line V—V in FIG. 4;

FIG. 6 is a horizontal section on line VI—VI of FIG. 4;

FIG. 7 is a vertical section on line VII—VII in FIG. 6;

Figure 1:
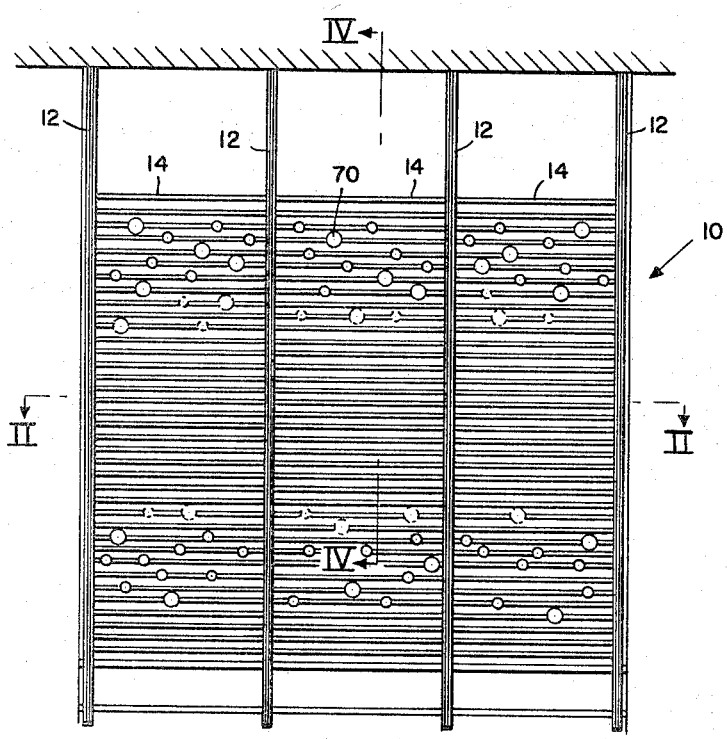
FIG. 1 is a front elevation of a barrier constructed in accordance with the invention.

The following description is directed to the specific forms of the barrier illustrated in the drawings and is not addressed to the scope of the invention, which may be practiced in a wide variety of forms.

Figure 3:
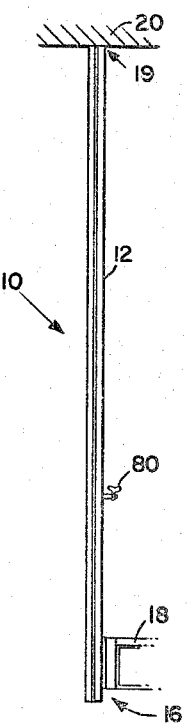
FIG. 3 is an end elevation of the barrier shown in FIG. 1.
Figure 2:
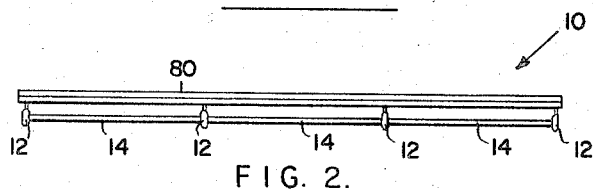
FIG. 2 is a horizontal section on line II—II of FIG 1.

Referring particularly to FIGS. 1, 2 and 3, the barrier constructed in accordance with the invention, generally designated 10, includes a plurality of upright laterally spaced posts 12 mounting a series of panels 14. The bottom of each post is connected, as at 16, to the edge of a landing 18, and the top of each post is connected, as at 19, to a ceiling 20.

Referring particularly to FIGS. 4 to 8, each post includes a front member 22 and a rear member 24. The members 22 and 24 are identical and uniform in transverse section. The inner face of each member is provided with a longitudinally extending recess 26 flanked by opposite side wall portions 28. The opposite sides of the member are tapered, as at 30. The outer face of the member is provided with a longitudinally extending slot 32 T-shaped in transverse section. The recess 26 of the rear member 24 receives a filler strip 34 fixed in position by a plurality of countersunk head screws 36 projected freely through the filler strip and threaded into the member 24. The filler strip 34 is of a thickness equal to the depth of the recess 26. Longitudinally spaced portions of the front member 22 are provided with bores 38 counterbored as at 40, and projected freely through the bores 38 are screws 42, the heads of which are nested in the counterbores 40 and the threaded ends of which are turned into the rear member 24.

Referring particularly to FIGS. 1 and 4 to 8, inclusive, each panel 14 comprises a series of horizontally extending vertically spaced parallel bars 44. The bar is provided with longitudinally extending upwardly converging upper surfaces 46 and longitudinally extending downwardly converging lower surfaces 48. Each end of the bar is blocked top and bottom, as at 52, thereby to form a tongue 54. At each end of the panel the tongues 54 are fitted into recesses 56 formed in one side of an end bar 58. The bars 44 are secured to the bars 58 by round head screws 60 projected freely through the bars 58 and threaded into the ends of the bars 44. The bars 58 are secured to the rear member 24 by round head screws 62 propected freely through the bars 58 and threaded into the filler strips 34.

The bar 44 is provided with a longitudinally extending T-shaped slot 64 on each side thereof, the slots being adapted to receive T-shaped ends 66 of stems 68 mounting decorative discs or facets 70.

Figure 8:
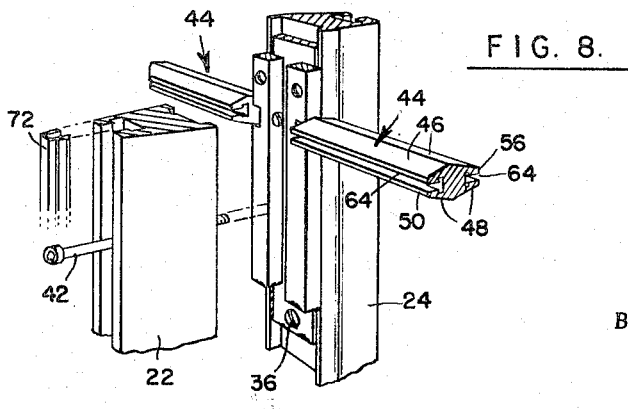
FIG. 8 is an exploded perspective view of typical barrier components.

Referring particularly to FIGS. 6, 7 and 8, inserted into the slot 32 of the front member 22 is a U-shaped filler strip 72 made of plastic material, and inserted into the slot 32 of the rear member 24 is the T-shaped end 74 of a coupling assembly 76. The coupling assembly mounts a bracket 78 supporting a railing 80.

Figure 10:
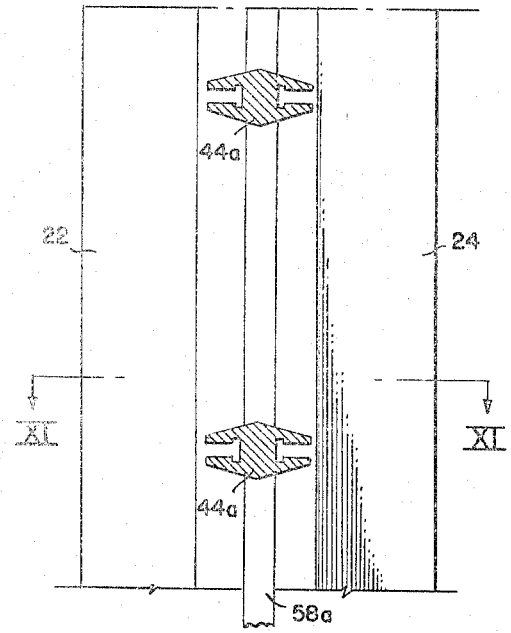
FIG. 10 is a vertical section on line X—X of FIG. 9.
Figure 9:
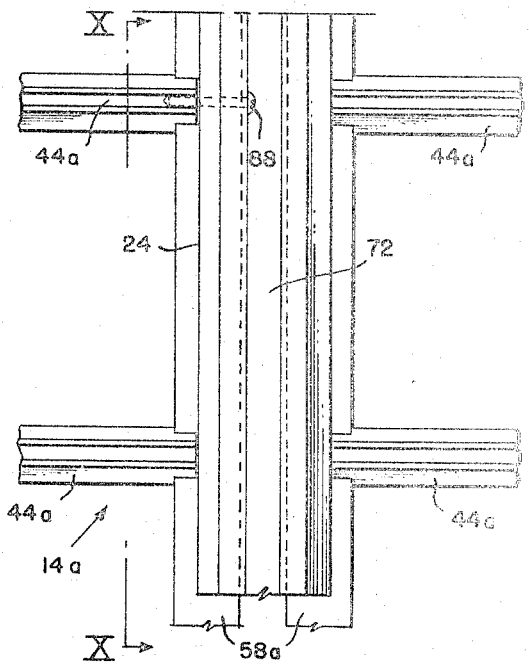
FIG. 9 is a fragmentary front elevation of a modified barrier constructed in accordance with the invention.
Figure 11:
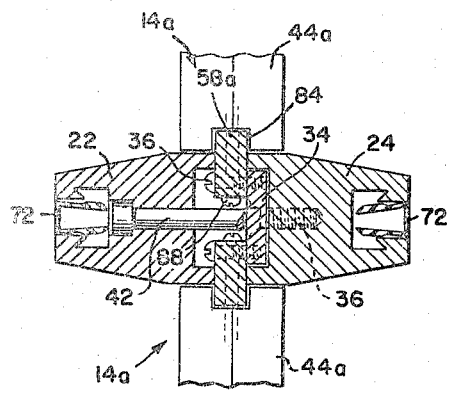
FIG. 11 is a horizontal section on line XI—XI of FIG. 10.

Referring particularly to FIGS. 9, 10 and 11, the post of the modified form of the barrier comprises the front member 22 secured to the rear member 24 by screws 42 and the filler strip 34 secured to the rear member 24 by screws 36. Both members are fitted with filler strips 72. The panels 14a are of open grillwork, similar to panels 14, except that the ends of the bars 44a are notched, as at 84, to receive the edges of end bars 58a. The bars 44a are secured to the bars 58a by round head screws 88 projected freely through the bars 58a and threaded into the ends of the bars 44a. The bars 58a are secured to the rear members 24 by round head screws 36 projected freely through the bars 58a and threaded into the filler strips 34.

Figure 12:
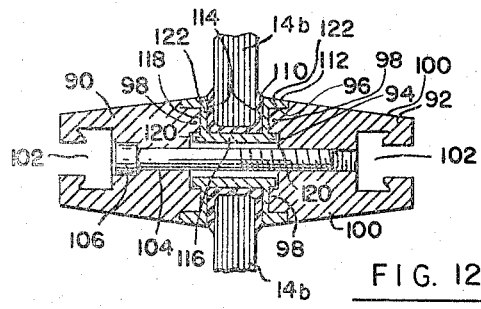
FIG. 12 is a horizontal section through a modified post construction.

Referring particularly to FIG. 12, the post of the modified form of the barrier comprises a front member 90 and a rear member 92, each recessed on its inner face, as at 94 and 96, thereby to provide longitudinally extending laterally spaced key elements 98. The opposite sides of the members are tapered, as at 100, and the outer faces of the members are provided with longitudinally extending slots 102 T-shaped in transverse section. The front member 90 is provided with a series of bores 104 counterbored, as at 106. Extending freely through the bores 104 and threaded into the rear member 92 are screws 108.

The panel 14b is a solid member edged with a plastic or rubber molding 110 U-shaped in transverse section and fitted into a specer member 112. The spacer member is generally U-shaped in transverse section and is provided with opposite side walls 114, base wall 116 and recesses 118, respectively in the opposite side walls 114 and forming at the base oppositely extending flanges 120 and at the top oppositely extending flanges 122. The recesses 118 receive the key elements 98.

Figure 13:
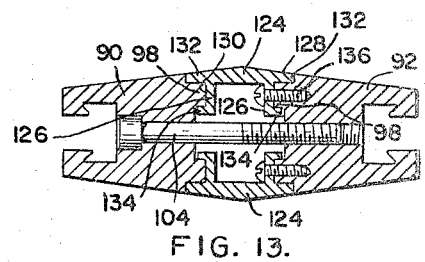
FIG. 13 is a horizontal section through still another modified post construction.

Referring particularly to FIG. 13, the modified post member includes the front member 90 and the rear member 92. Interposed between the members 90 and 92 are spacer members 124 each having opposite side walls 126 and a base wall 128. The opposite side walls 126 are recessed, as at 130, thereby to provide at the base oppositely extending flanges 132 and at the top oppositely extending flanges 134. The recesses 130 receive the key elements 98. The spacers are secured to the rear member 92 by means of round head screws 136 projected freely through a side wall of the spacer member and threaded into the rear member 92.

Figure 14:
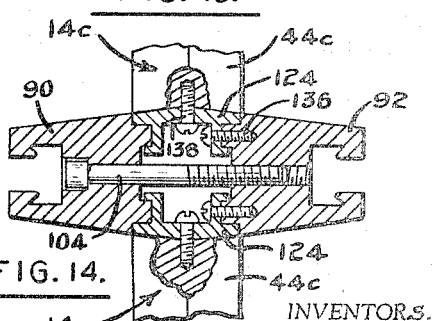
FIG. 14 is a horizontal section through an additional modified post construction.

Referring particularly to FIG. 14, the post of the modified form of the barrier comprises the front member 90 secured to the rear member 92 by screws 104.

The panels 14c are of open grillwork, similar to panels 14 and 14a, except that the ends of the bars 44c are shaped to abut the end bars 124. The bars 44c are secured to the bars 124 by round head screws 138 projected freely through the bars 124 and threaded into the ends of the bars 44c. The bars 124 are secured to the rear member 92 by round head screws 136 projected freely through the bars 124 and threaded into the rear member 92.

Referring particularly to FIGS. 1 to 8, election of the barrier is effected as follows: First, the rear members 24 of the posts are positioned at the required distance apart and suitably anchored at the bottom and top respectively to the landing 18 and the ceiling 20. Then the panels 14 are assembled by fitting the tongues 54 of the grill bars 44 into the recesses 56 of the end bars 58 and securing them in position by means of screws 60. The assembled panels of open grillwork are then lifted into position and secured in place by means of screws 62. The panels are then fitted with any desired number of facets 70 by slipping them over the ends of the grill bars 44 and sliding them along the grill bars to the desired positions thereof. Then the front members 22 are positioned and secured by means of screws 42. The panels are not only held in position by screws 62 but are clamped between the members 22 and 24. Now the filler strips 72 are inserted in the slots 32 of the front members 22, closing the slots and covering the heads of the screws 42. The rear members 24 may now be fitted with coupling assemblies 76 and the rail 80 may be mounted on the coupling assemblies, which may be moved up and down to any suitable height.

Referring particularly to FIGS. 9, 10 and 11, erection of the modified barrier is not materially different from erection of the barrier of FIGS. 1 to 8. It will be noted that the slots 32 in both the front member 22 and the rear member 24 are fitted with filler strips 72.

Referring particularly to FIG. 12, the rear members 92 of the posts are positioned at the required distance apart and suitably anchored at the top and the bottom. The panels are then lifted into position and the key elements 98 of the rear members 92 are fitted into the recesses 96 of the spacer members. The panel is then temporarily secured in position by any suitable means. Next, the members 90 are positioned, as shown, and secured by means of screws 108. Thus the panels are clamped in position between members 90 and 92.

Referring particularly to FIG. 13, the spacer members 124 are fitted to the rear member 92 and secured thereto by means of screws 136. Then the front member 90 is fitted to the spacer members and secured thereto by means of screws 104.

Referring particularly to FIG. 14, erection of the modified barrier is not materially different from erection of the barrier of FIGS. 1 to 8 or the barrier of FIGS. 9, 10 and 11.

It will be understood that either or both of the spacer members 124 may be removed and replaced by a panel 14b.

What is claimed is:

1. In a structure of the character described, the combination comprising a post, and a pair of panels respectively framed into opposite sides of said post, said post including first and second longitudinally extending laterally spaced post members substantially identical and uniform in transverse section, the opposed surfaces of said post members being provided with longitudinally extending recesses, a filler strip fixedly nested in one of said recesses and of a thickness corresponding to the depth of said recess, and a plurality of elements projected freely through one of said members and threaded into the other member for clamping said panels between said members, the end of each panel framed into said post including a vertically extending marginal area disposed between said post members and affixed to the underlying filler strip independently of the post members.

2. The combination according to claim 1 wherein the elements clamping the panels between the post members are screws which pass freely between the opposed ends of the panels, the ends of the panels are screwed to the filler strip, and the filler strip is disposed in the recess of the first member while the heads of the screws affixing the ends of the panels to the filler strip are disposed in the recess of the second post member.

References Cited by the Examiner

UNITED STATES PATENTS

| 1,961,006 | 5/1934 | Marty | 52—730 X |
| 2,801,600 | 7/1957 | Bowden | 52—732 X |
| 2,834,997 | 5/1958 | Webb | 52—475 |
| 2,901,785 | 9/1959 | Hinchliffe | 52—475 X |
| 2,962,133 | 11/1960 | Kivett | 52—463 |
| 3,028,938 | 4/1962 | Schorr | 52—495 X |
| 3,052,330 | 9/1962 | Hammitt | 52—495 |
| 3,127,639 | 4/1964 | Hammitt | 52—397 |
| 3,152,672 | 10/1964 | Oppenhuizen | 52—731 X |
| 3,158,961 | 12/1964 | Hawkins | 52—395 |

FOREIGN PATENTS

| 619,682 | 1961 | Canada. |
| 709,039 | 1954 | Great Britain. |
| 330,392 | 1958 | Switzerland. |

FRANK L. ABBOTT, *Primary Examiner.*

JOHN E. MURTAGH, RICHARD W. COOKE, JR.,
*Examiners.*